United States Patent [19]

Muirhead

[11] Patent Number: 4,828,315

[45] Date of Patent: May 9, 1989

[54] SECTIONALIZED PICKUP TRUCK CANOPY TOP ASSEMBLY

[76] Inventor: Scott A. W. Muirhead, 276 Centennial Parkway, Delta, Canada, V4L 1K5

[21] Appl. No.: 122,785

[22] Filed: Nov. 19, 1987

[51] Int. Cl.⁴ ............................................. B62D 25/00
[52] U.S. Cl. .................. 296/99.1; 296/164; 296/100; 296/102; 296/10
[58] Field of Search ............... 296/100, 102, 156, 164, 296/10, 99 R, 37.6

[56] References Cited

U.S. PATENT DOCUMENTS

| | | | |
|---|---|---|---|
| 3,390,913 | 7/1974 | Hunter | 296/10 |
| 3,508,786 | 4/1970 | Colville | 296/99 |
| 3,508,787 | 4/1970 | Strong et al. | 296/100 |
| 3,741,605 | 6/1973 | Lee | 296/10 |
| 3,857,601 | 12/1974 | Robbins | 296/10 |
| 3,880,458 | 4/1975 | Jackson | 296/164 |
| 3,897,100 | 7/1975 | Gardner | 296/10 |
| 3,954,296 | 5/1976 | Patnode | 296/10 |
| 4,103,956 | 8/1978 | Faulstick | 296/10 |
| 4,123,099 | 10/1978 | Mashigan | 296/10 |
| 4,202,579 | 5/1980 | Berggren | 296/156 |
| 4,215,894 | 8/1980 | Sidlinger | 296/3 |
| 4,221,423 | 9/1980 | Stone | 296/100 |
| 4,252,363 | 2/1981 | Rodrigue | 296/100 |
| 4,296,961 | 10/1981 | Hunt et al. | 296/216 |
| 4,305,614 | 12/1981 | Holka | 296/37.16 |
| 4,315,653 | 2/1982 | Sparling | 296/156 |
| 4,324,429 | 4/1982 | Wilson et al. | 296/100 |
| 4,335,916 | 6/1982 | Gutgsell | 296/100 |
| 4,358,151 | 11/1982 | Wood | 296/146 |
| 4,396,221 | 8/1983 | Morgan et al. | 296/84 C |
| 4,469,370 | 9/1984 | Peterson | 296/218 |
| 4,496,184 | 1/1985 | Byrd et al. | 296/100 |
| 4,595,230 | 6/1986 | Fettes | 296/102 |
| 4,627,655 | 12/1986 | Collins | 296/167 |
| 4,688,845 | 8/1987 | Kingsley | 296/99 R |

*Primary Examiner*—Robert R. Song
*Attorney, Agent, or Firm*—Howard A. Kenyon

[57] ABSTRACT

A pickup truck cargo canopy assembly which is enclosed and provides complete protection from weather, theft and vandalism in the cargo area is described. The cargo canopy assembly is divided into two separate sections. The front canopy section which is mounted permanently to the truck bed sidewalls and frontwall is provided with an opening behind the pickup truck cab window and a functional window on each side. The rear canopy section which is unitarily manufactured is attached to the front section and the truck bed sidewalls by clamps that may be detached by removing a pin holding the two parts of the clamp together. This provides a removable rear section that may be stored when an open truck bed is desired. A hinged rear window assembly is attached to the rear edge of the top of the rear canopy section that also contains a latch and lock to provide a secure cargo area.

21 Claims, 3 Drawing Sheets

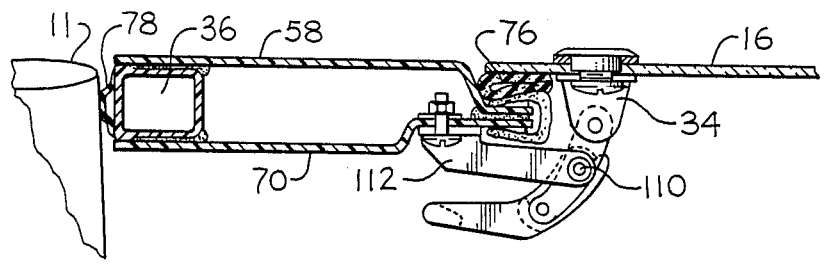
FIG. 6
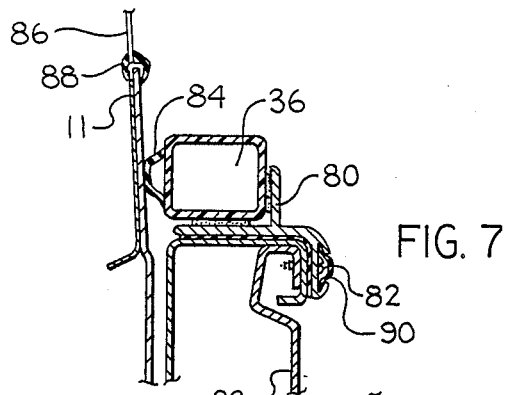
FIG. 7
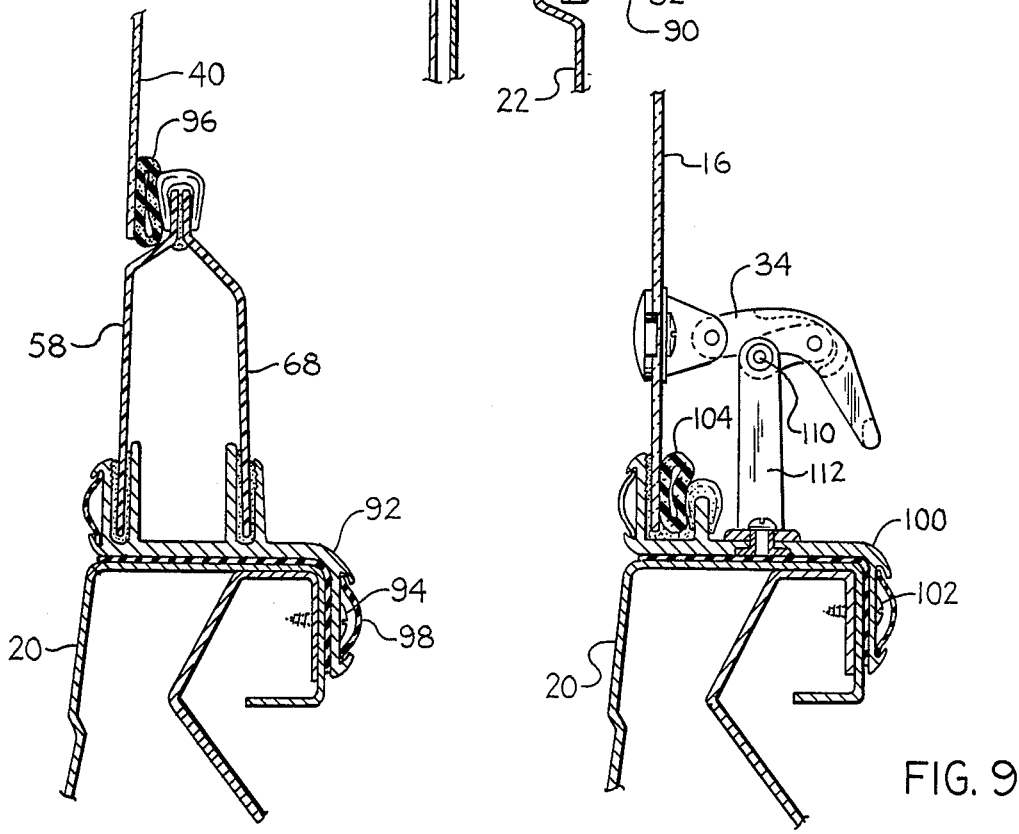
FIG. 8
FIG. 9
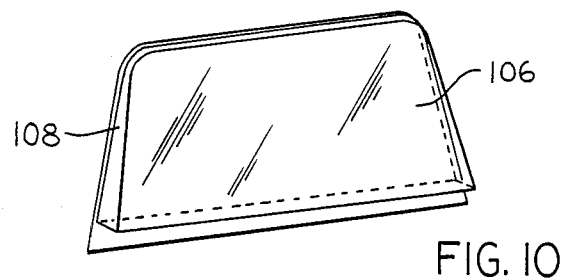
FIG. 10

SECTIONALIZED PICKUP TRUCK CANOPY TOP ASSEMBLY

BACKGROUND OF THE INVENTION

1. Field of the Invention

This invention is generally directed to a protective cover of the cargo area of a conventional pickup truck and more particularly to a light weight unitary copolymiric plastic removable rear canopy section attached to a permanently mounted front canopy section, both sections covering the cargo area.

2. Description of the Prior Art

The dramatic increase in the popularity of a pickup truck as a transportation and recreational vehicle has contributed to the need for a canopy top which is more suited to the diverse needs of the vehicle operator than has here-to-fore been achieved by the universally available and commercially popular canopy tops. There are several prior art canopy tops that are commercially popular. Once such top is described in U.S. Pat. No. 4,627,655 to Collins. Collins describes a canopy top that covers the entire cargo area which is unlike the present invention as the entire canopy in Collins is mounted permanently to the truck cargo area. Other relevant art is U.S. Pat. No. 3,857,601 to Robbins. Robbins mounts his cargo top enclosure permanently and does not have a quick release as in the present invention. Another patent of relevance is U.S. Pat. No. 4,335,916 to Gutgsell. This patent describes a cover which is hinged on top in the vicinity of the pickup truck cab. This is completely different from the present invention. Another prior art patent is U.S. Pat. No. 3,390,913 to Hunter. Hunter describes a partial cargo cover that has a roll up curtain for a rear window.

All of the above prior art does not allow the owner of a pick up truck to have a permanently attached front canopy section and a rear canopy section that is quickly detachable to allow loading of large or bulky cargo. In addition, none of the above prior art patents describe a unitary construction of the cargo canopy as is described in the present invention.

SUMMARY OF THE INVENTION

It is the primary object of this invention to provide a canopy to enclose the cargo area of a pickup truck.

It is another object of this invention to provide a pickup truck canopy with a permanent front section and a removable rear section.

It is yet another object of this invention to provide a design so that the rear canopy section can be formed unitarily.

It is still another object of this invention to provide a latching system on the removable rear canopy that can easily and quickly be disengaged so the rear canopy section can be easily and quickly removed.

Briefly, in accordance with the invention, there is provided a complete canopy top for a pickup truck that encloses a cargo area to provide a complete weather tight area as well as a secure area. The front section consists of a unitarily formed outer cover and a 3 piece inner liner with a separate window frame which is sealed and permanently attached to the inner liner. Two small hinged windows are fitted on each side of the front canopy section that are sealed weather tight when closed. An opening, closing and latching mechanism is provided for each window that allows the window to open for ventilation purposes. The front section is permanently mounted with a seal on the top of the front wall and sidewall of the cargo section.

A removable rear canopy section is provided where the two sides and top is unitarily formed. The removable rear canopy section contains a hinged rear window assembly with a latching and locking system to provide rear access to the cargo area and when closed and locked, compresses a seal to provide a weathertight joint. The rear canopy section contains latches which are of the over-center cam type. These latches are also detachable where the removal of a pin allows part of the latch to be permanently mounted to the cargo side wall top and the rear edge of the front canopy section and part of the latch to remain with the removable rear canopy section. A seal is provided where the edge of the rear canopy section engages in order to provide a weathertight compartment when the latches are tightened.

Other objects and advantages will become apparent from the following description and appended claims taken in conjunction with the accompanying drawings.

DESCRIPTION OF THE DRAWINGS

FIG. 6 is a cross section showing the cab to front canopy section seal, the top of the front canopy cover and liner fastened together and sealed, the front canopy to rear canopy at the top of both sections and the latch mechanism in its closed position.

FIG. 7 is a cross section showing the seal between the window frame and the cab in the front canopy section with an extruded member sealed and permanently attached to top of the frontwall of the cargo compartment;

FIG. 8 is a cross section of the side of the front canopy section showing the small window seal, the front canopy cover and liner fitted and sealed into an extrusion permanently fastened and sealed to the top of the sidewall of the cargo compartment;

FIG. 9 is a cross section of the side of the cargo sidewall showing the removable rear canopy section sealed into a permanently attached and sealed extruded member and the latch mechanism in it's closed position;

FIG. 10 is a perspective view of the rear plastic window that fits into the rear window assembly of the rear canopy section.

DETAILED DESCRIPTION OF THE INVENTION

Figure 1:
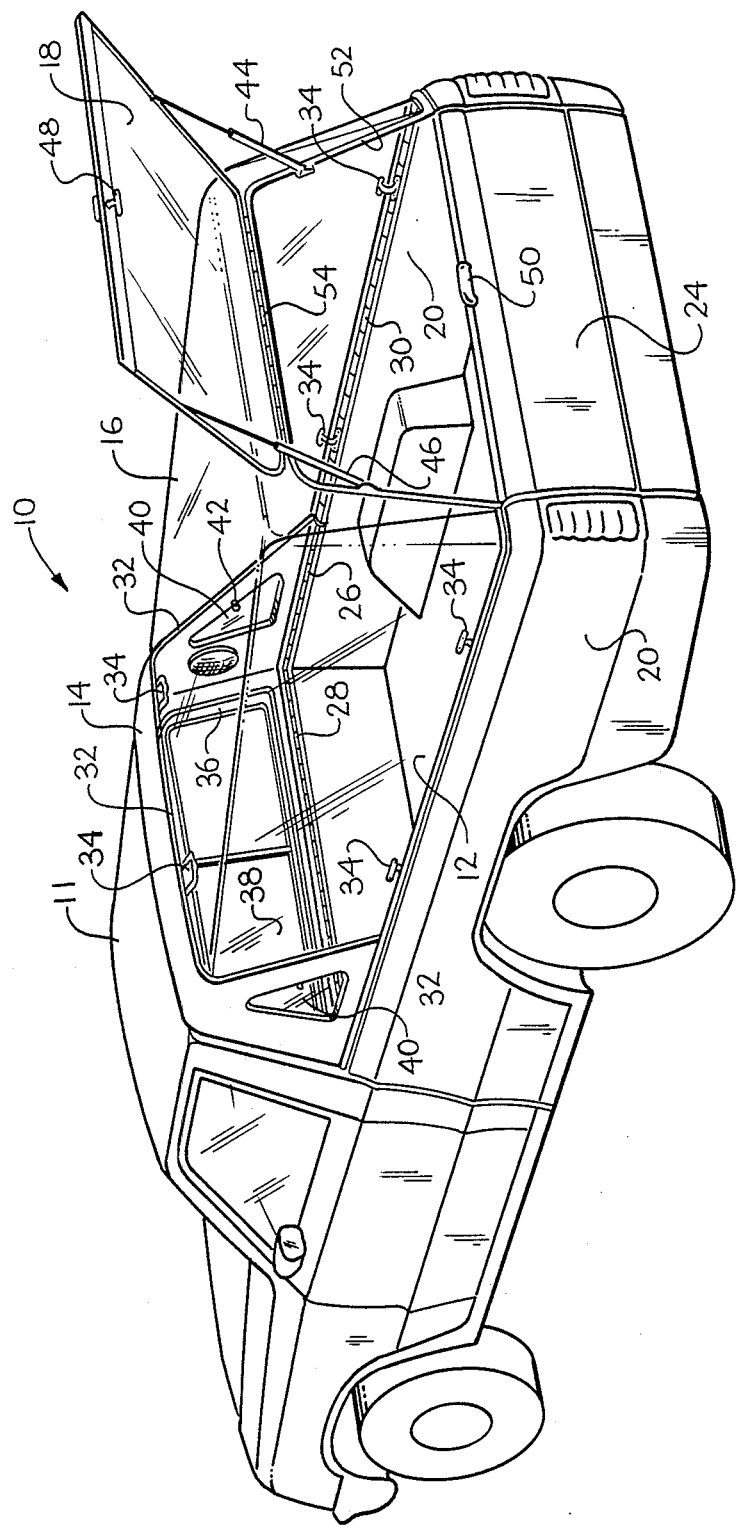
FIG. 1 is a perspective view showing the permanently attached front canopy section and the removable transparent rear canopy section and rear window assembly of the present invention installed onto the bed of a conventional pickup truck vehicle.

Referring now to FIG. 1 there is shwn, according to the present invention, a perspective view generally indicated as 10 of a pickup truck with a cab 11, a cargo section 12 covered by a canopy section to provide protection for the cargo against weather damage and theft.

The canopy section consists of a permanently attached front canopy section 14, a removable rear canopy section 16 an a pivotally hinged rear window assembly 18. The cargo section consists of two sidewalls 20, a frontwall 22 and a tailgate 24. The front canopy section 14 is permanently mounted to sidewalls 20 and frontwall 22 by permanently mounting extruded members 26 and 28 (the cross section which is shown in FIGS. 7 and 8) to the top of sidewalls 20 and front wall 22. The extruded members 26 and 28 are preferably fastened to the top of sidewalls 20 by screws with sealing means therebetween.

Another permanently mounted extruded member 30 is mounted to the top of the sidewalls 20 in the rear potion of the cargo section 12. Extruded member 30 (a cross section is given in FIG. 9) is also fastened to the top of the sidewalls 20 by screws with sealing means therebetween. A bulb type seal (shown in FIGS. 6 and 9) fits on member 30 and provides a weathertight seal between the rear canopy section 16 and the member 30. The front canopy section 14 also has a bulb type seal along the edge 32 that also provides a watertight seal between the front canopy 14 section and the rear canopy section 16. Latch mechanisms 34 are of the over-center cam type, and when closed, pushes the rear canopy section against the bulb type seal and provides a weathertight cargo compartment.

Figure 4:
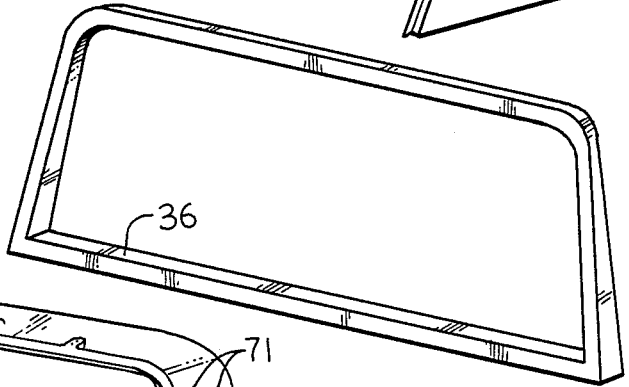
FIG. 4 is a perspective view showing the front window frame of the front canopy section.
Figure 5:
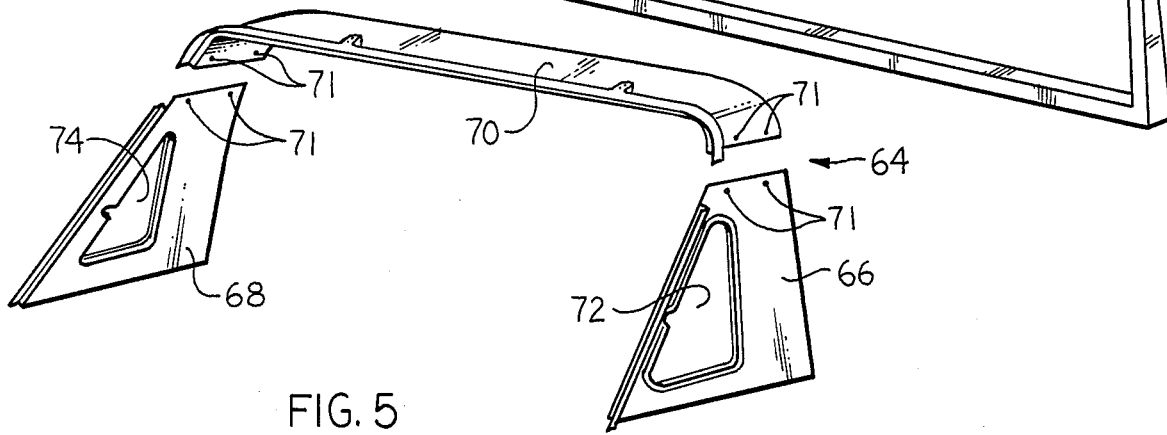
FIG. 5 is a perspective view showing the interior cover parts of the front canopy section.

The front canopy section 14 contains an open window frame 36 (shown in FIG. 4) which is attached to the inner liner (shown in FIG. 5). The open window frame 36 provides access from the cargo section 12 through the pickup truck's sliding rear window 38. The front canopy section also contains side windows 40 that are located on each side and hinged on the front and contain an over-enter latch mechanism 42 that extends the windows outward to the length of the latch mechanism when in the open position. When closed, the windows close against a seal (shown in FIG. 8) to provide a weathertight compartment.

The rear window assembly 18 as shown in FIG. 1 contains struts 44 and 46 that have a locking mechanism (not shown) in the up position. Whenever the window 18 is lowered, the struts 44 and 46 provide a snubbing action to prevent the window assembly 18 from crashing against tailgate 24. Latching and locking mechanism 48 and 50 provide a secure window assembly 18 when closed. A seal 52 is also provided around the edge of the rear canopy whereby when the window assembly 18 is closed, a weather tight compartment is provided.

Figure 2:
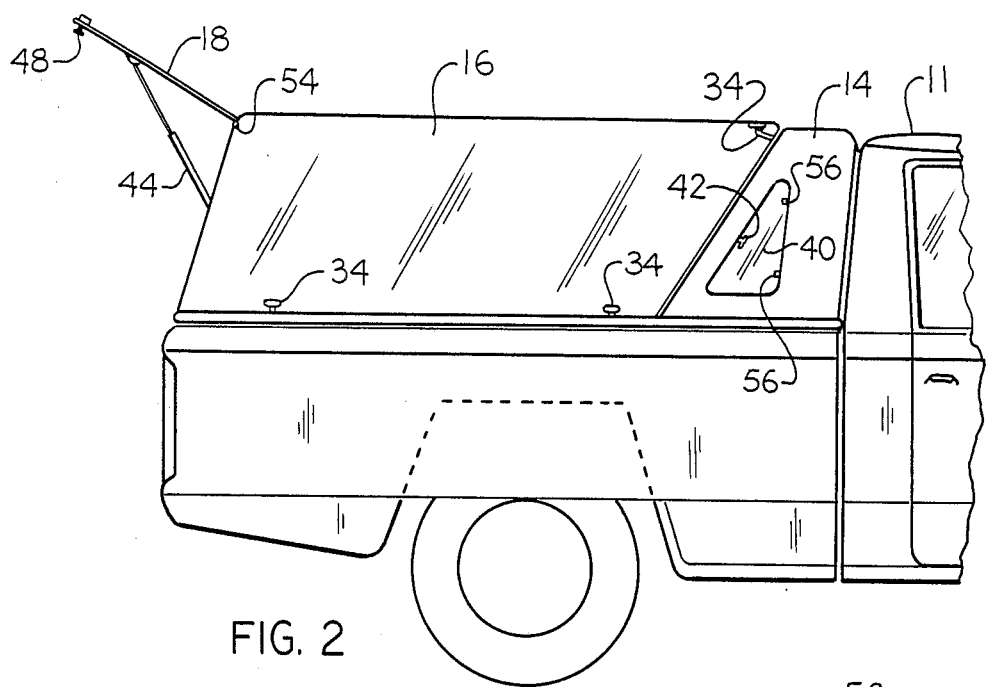
FIG. 2 is a side elevation view, in partial section, showing the present invention installed on a pickup truck vehicle.

Turning now to FIG. 2, there is seen a side elevation view of the present invention. The permanently mounted front canopy section 14 is shown joined to the removable rear canopy section 16. The rear window 18 is also shown along with strut 44. Latch and lock mechanism 48 is seen with the window 18 open. A piano type hinge 54 (shown in FIG. 2) is used where the plastic window 18 is attached to the top of the rear canopy section 16 to provide more structural stability and strength. The right hand window 40 is also seen in this view and when opened, provides ventilation to the front of the cargo compartment 12. The window 40 also contains 2 hinges 56 and a latch mechanism 42 as previously described. Also in the view can be seen detachable latches 34.

Figure 3:
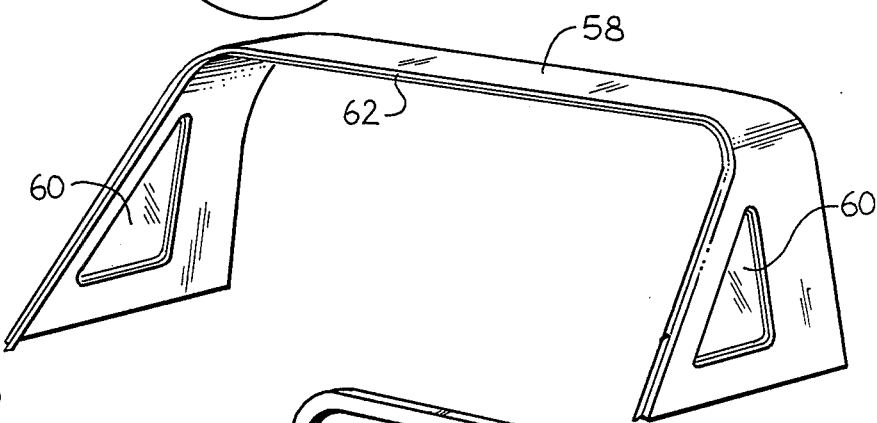
FIG. 3 is a perspective view showing the exterior cover of the front canopy section.

FIG. 3 is a perspective view of the outer cover 58 of the forward canopy section 14 which is unitarily formed with window openings 60 and an edge adapted to receive a bulb type compression seal as shown in FIGS. 6 and 8. The outer cover 58 of the forward canopy section 14 is molded from a suitable thermo-plastic material. In the preferred embodiment, the preferred material is olefin-modified styrene-acrylonitrile (OSA) andaerybnitrile-butadiene-styrene (ABS) copolymere. Another material which can be used is acrylic styrene-acrylonitrille (ASA) and ABS capolymer materials. The OSA and ASA provides resistance to changes in physical properties and color when exposed to sunlight and the ABS substraits provides structural strength and integrity or FRP material.

Turning now to FIG. 4, there is a perspective view of the open window frame 36 whose side member 35 is attached to the inner liner flange 73 (shown in FIG. 5) of the front Canopy section 14.

FIG. 5 is a perspective view of the inner liner generally shown as 64, consisting of a right side 66, a left side 68, and a top member 70. The inner liner members 66, 68 and 70 are thermoformable acrybnitrile-butadiene-styrene as the preferred embodiment. Another material that could be used is vacuum formable vinyl or fabric laminater interior when fabricating head liner 70 and opposing interior sidewall liner panels 66 and 68. The open areas 72 and 74 in liner panels 66 and 74 respectively correspond to areas 60 in the outer cover 58 shown in FIG. 3. These openings will receive the ventilating windows 40 previously described. Flange 73 is designed to receive the side member 35 of frame 36 and is adhesively bonded. The numbers 66, 68 and 70 are joined by inserting snap fasterers 71 in the preferred embodiment. Other means of fastening can be screws or bolts with captured nuts. When the exterior cover 58 and the interior liner generally shown as 64 are assembled, an adhesive bond is made at all the edges where the two members 58 and 64 make contract.

FIG. 6 presents a cross section view of the forward canopy section cover 58 and inner liner 70 which combined make up the forward canopy section 14. A side view is shown of one of the over-center-cam latches 34 that secure the rear canopy section 16 to the front canopy section 14. A bulb type seal 76 which is fitted and bonded over the ends of members 58 and 70. A seal 78 bonded to member 36 is shown in the compressed state between member 36 and the back of the pickup truck cab 11.

FIG. 7 is a cross section view of the bottom of the window frame member 36 fitting on top of the frontwall 22 of the cargo area. As seen, an extrusion 80 is adhesively bonded and fastened, preferably with screws 82 to the frontwall 22. The window frame 36 is thereafter adhesively bonded to the extrusion 80. A seal 84, bonded to the window frame member 36 is shown in is compressed state between member 36 and the back of the pickup truck 11. Although not part of this invention, 86 is part of the rear window in the pickup truck and 88 is the seal at the bottom of the window. A plastic strip 90 which is optional is shown covering screws 82 for trim purposes.

FIG. 8 is a section view taken on the bottom of the side of the front canopy section showing the cargo compartment sidewall 20. An extruded member 92 is adhesively bonded and fastened preferably by screws 94 to sidewall member 20. This view also shows inner liner 68 and outer cover 58 fitted and adhesively bonded to extruded member 94. Side window 40 is also shows with a bulb type seal 96 in the compressed state with the bulb type seal 96 fitting and bonded to the ends of inner liner 68 and outer cover 58. A plastic strip 98 which is optional is shown covering the screws 94 for trim purposes.

FIG. 9 is a cross section view of the removable rear canopy cover 16 and the cargo compartment sidewall 20. An extruded member 100 is adhesively bonded and fastened, preferably with screws 102 to the top of sidewall 20. An over-center cam latch mechanism 34 is shown between the rear canopy cover 16 and the top of the sidewall 20. A bulb type seal 104 in the compressed state is shown fitted and bonded to a flange on the extruded member 100.

FIG. 10 shows an optional embodiment 106 for the rear window transparence 18. In this embodiment, the rear window transparency is offset, outward, at the bottom as indicated by 108. This offset 108 has the effect of reducing the torsional forces in the transparence 106 when the pickup truck flexes under stressful operating conditions.

The rear canopy section is removed by pulling a removable pin 110 in the over-center cam latches 34. In this manner, the post 112 remains with the pickup truck while the remainder of latch 34 is removed with the rear canopy section 16. The rear canopy section 16 is replaced in the reverse manner. The pin 110 has a hole in the small end which is designed to receive a spring biased locking pin (not shown).

Thus, it is apparent that there has been provided in accordance with the invention, a sectional pickup truck top assembly that fully satisfied the objective, aims and advantages set forth above. While the invention has been described in conjunction with specific embodiments thereof, it is evident that there may be alternatives, modifications, and variations that will be apparent to those skilled in the art in light of the aforegoing description. Accordingly, it is intended to embrace all such alternatives, modifications and variations which fall within the spirit and scope of the appended claims.

What is claimed is:

1. A light weight pickup truck having a sectional canopy top assembly comprising:
   a cargo compartment having a bed, two sidewalls, a frontwall and a hinged tail gate, said sidewalls, and said frontwall and said tailgate having a top edge;
   a front canopy section permanently attached to said cargo compartment with sealing means, having a top, a front portion and two side portions, said top and two side portions having a rearwardly facing edge, said front canopy section having sealing means between said front portion and the pickup truck;
   a removable rear canopy section having a top, two sides and a rear window assembly, said top having a front and rear facing edges, said sides having a downward facing edge, said rear window assembly being permanently hinged to the top edge of said removable rear canopy section;
   rear canopy section mounting members permanently attached with attaching means and a watertight seal to the top of each of said cargo compartment sidewalls;
   a plurality of clamping latches detachably connected to said rearwardly facing edge of said front canopy section top and said front facing edge of aid rear canopy section top;
   a plurality of clamping latches detachably connected to said rear canopy side downward edges and said rear canopy section mounting members.

2. A light pickup truck having a sectional top assembly as described in claim 1 wherein said front canopy section and said removable rear canopy section enclose the entire truck bed cargo assembly.

3. A light pickup truck having a sectional top assembly as described in claim 1 wherein said front canopy section is composed of an exterior cover and an interior liner.

4. A front canopy section as described in claim 3 wherein said exterior cover and said interior liner is formed from a suitable thermoplastic material, said inner liner being fastened to said exterior cover with sealing means therebetween.

5. A light pickup truck having a sectional top assembly as described in claim 1 wherein said front canopy section contains opposed pivotally hinged windows located on each side of said front canopy section, said pivotally hinged windows having sealing means and latching means, said front canopy section also containing a window opening located on said front portion of said front canopy section whereby said window opening provides an access between the driver section and the front canopy section.

6. A light pickup truck having a sectional top assembly as described in claim 1 wherein said front canopy section is permanently mounted to a front canopy section mounting member that is permanently attached with a watertight seal and attaching means to the top of said cargo compartment frontwall and to the top of part of said cargo section sidewalls.

7. A light pickup truck having a sectional top assembly as described in claim 1 wherein said front canopy section contains a rearwardly facing flange permanently attached to said rearwardly facing edge, adapted to retain a soft rubber bulb seal gasket, said bulb seal gasket being bonded to said rearwardly facing flange.

8. A bulb seal gasket as described in claim 7 wherein said front edge of said rear canopy section is fitted in an overlap manner against the side of said bulb seal gasket.

9. A light pickup truck having a sectional top assembly as described in claim 1 wherein said clamping latches connected to said rearwardly facing edges of said front canopy section top and said front facing edge of said rear canopy section top when activated closed, collapse the bulb seal gasket between said rearwardly facing edge of said front canopy section and said front edge of said rear canopy section whereby the collapsing of said bulb type seal provides a weather tight joint between said rear canopy section and said front canopy section.

10. A light pickup truck having a sectional top assembly as described in claim 1 wherein said removable rear canopy section is unitarily formed from a copolymeric plastic material which is partially translucent.

11. A light pickup truck having a sectional top assembly as described in claim 1 wherein said rear window of said rear window assembly is unitarily formed from a copolymeric plastic material which is partially translucent, said window containing a top edge, a bottom edge and two side edges.

12. A light pickup truck having a sectional top assembly as described in claim 1 wherein said rear window assembly contains a closing strut attached to both window side edges and said rear facing edges of said rear canopy section whereby said closing strut contains latching means to hold the window assembly up and snubbing means to allow the window to close slowly.

13. A light pickup truck having a sectional top assembly as described in claim 1 wherein said window assembly contains a latch and locking assembly between said bottom edges of said window and said top edge of said tail gate whereby said window assembly when closed engages said latch and locking assembly to allow said pickup truck cargo top assembly to be secured.

14. A window assembly as described in claim 13 wherein said window assembly when closed collapses a seal bonded to said rear facing edge of said rear canopy section thereby forming a watertight seal between said window and said rear facing edge of said rear canopy section.

15. A pickup truck having a sectional top assembly as described in claim 1 wherein the top edge of the cargo compartment sidewalls contains an upwardly facing flange having an upward facing groove permanently attached with attaching means and sealed to said top edge of said cargo compartment sidewall adapted to retain a soft rubber bulb seal gasket bonded to said upwardly facing flange.

16. A pickup truck having a sectional top assembly as described in claim 15 wherein said downward facing edges of said rear canopy section fits into said upwardly facing groove which is formed on the upper portion of said upwardly facing flange, said groove containing said bulb seal gasket.

17. A light pickup truck having a sectional top assembly as described in claim 16 wherein said clamping latches connected to said rear canopy side downward edge and said rear canopy section mounting member, when activated closed, collapse the bulb seal gasket in said upwardly facing groove between said rear canopy mounting members and said downward facing edge of said sides of said rear canopy section whereby the collapsing of said bulb type seal provides a weather tight joint between said rear canopy section and said rear canopy mounting members.

18. A light pickup truck having a sectional top assembly as described in claim 1 wherein said front canopy section contains an open window frame fitted inside the front canopy section with fastening and sealing means to said interior liner.

19. A light pickup truck having a sectional top assembly as described in claim 1 wherein said rear window assembly contains a transparent section that is offset toward the exterior portion of the rear canopy section.

20. A light pickup truck having a sectional top assembly as described in claim 1 wherein said front canopy section exhibits a forward facing front engaged with a rearward side of the pickup truck cab, said front extending across substantially the entire height and width of said front canopy section and further comprising compressible elastic sealing means being compressible engaged against the rearward side of the pickup truck cab to sealingly close the space between said front canopy section and said pickup truck cab.

21. A light pickup truck having a sectional top assembly as described in claim 1 wherein said detachable latches contain a removable pin that when removed allows said rear canopy section to be easily removed from the pickup truck cargo area.

* * * * *